United States Patent [19]

Ono

[11] Patent Number: 5,696,894
[45] Date of Patent: Dec. 9, 1997

[54] PRINTING SYSTEM

[75] Inventor: Kenichi Ono, Tokyo, Japan

[73] Assignee: Canon Kabushiki Kaisha, Tokyo, Japan

[21] Appl. No.: 759,835

[22] Filed: Dec. 4, 1996

Related U.S. Application Data

[63] Continuation of Ser. No. 308,547, Sep. 21, 1994, which is a continuation of Ser. No. 787,783, Nov. 4, 1991.

[30] Foreign Application Priority Data

| Nov. 5, 1990 | [JP] | Japan | 2-297138 |
| Nov. 5, 1990 | [JP] | Japan | 2-297139 |
| Nov. 5, 1990 | [JP] | Japan | 2-297140 |

[51] Int. Cl.$^6$ .................................................. G06K 15/00
[52] U.S. Cl. ................................... 395/114; 395/105
[58] Field of Search .................................. 395/101, 114, 395/115, 105, 511, 518, 520, 834–839; 400/70, 73, 76; 358/402, 434, 435, 436, 408, 444; 340/286.02, 825.72

[56] References Cited

U.S. PATENT DOCUMENTS

| 4,746,932 | 5/1988 | Sato | 400/73 |
| 4,754,428 | 6/1988 | Schultz et al. | 395/114 |
| 5,179,637 | 1/1993 | Nardozzi | 395/163 |
| 5,220,674 | 6/1993 | Morgan et al. | 395/114 |

*Primary Examiner*—Arthur G. Evans
*Attorney, Agent, or Firm*—Fitzpatrick, Cella, Harper & Scinto

[57] ABSTRACT

A printing system comprises one or more data sources for generating print data and for sending the print data to one of a plurality of printing units by wireless communication and a specifying circuit, provided for each of said data sources, for specifying the printing-unit to which the data source corresponding to the specifying circuit should transmit the print data, wherein the specifying circuit specifies the printing unit to which the print data should be transmitted on the basis of information regarding each of the printing units which is transmitted from each printing unit by the wireless communication. The information regarding the printing unit includes printing speed information, paper size information, information indicating whether the printing unit can print both sides of a recording paper or not, or information indicating whether the printing unit is in a busy state or a ready state. The specifying circuit transmits an ID code to identify the specified printing unit to the data source corresponding to the specifying circuit.

41 Claims, 8 Drawing Sheets

| JOB NAME | VOLUME | | PRINTER ID |
|---|---|---|---|
| JOB001 | 10 | | P001 |
|  |  | | |
| JOB002 | 5000 | | P00X |

| JOB NAME | PAPER SIZE | | PRINTER ID |
|---|---|---|---|
| JOB001 | A4 | | P001 |
|  |  | | |
| JOB002 | B4 | | P00X |

| JOB NAME | BOTH SIDES · ONE SIDE | | PRINTER ID |
|---|---|---|---|
| JOB001 | BOTH SIDES | | P001 |
| | | | |
| JOB002 | ONE SIDE | | P00X |

| PRINTER ID | | PRINTER STATUS |
|---|---|---|
| P001 | | BUSY |
| | | |
| P00X | | FREE |

PRINTING SYSTEM

This application is a continuation of application Ser. No. 08/308,547 filed Sep. 21, 1994, which is a continuation of application Ser. No. 07/787,783 filed on Nov. 4, 1991.

BACKGROUND OF THE INVENTION

1. Field of the Invention

The invention relates to a printing system in which one or a plurality of host computers and a group of a plurality of printers execute printing processes while performing wireless communications.

2. Related Background Art

Hitherto, in such a kind of printing system, in the case where the operator executes a printing process as one job, the operator hardly performs a troublesome procedure such that the printer is selected in accordance with a print volume of the job.

Therefore, there is a variation in dependence on the operators such that a low speed printer is selected for a job of a large print volume or, contrarily, a high speed printer is selected for a job of a small volume. There is a problem such that a load according to the performance of the printer cannot be applied to each printer and, eventually, a using efficiency of the printer deteriorates as a whole system.

In such a kind of printing system, in the case where the operator executes the printing process as one job, the operator discriminates which paper size is needed for the job and recognizes in which printer the papers of such a paper size have been set, and thereafter, he must designate the printer and execute an outputting process.

Therefore, in the case where the job needs the paper size of, for example, A4H (in the lateral direction), the operator checks in which printer the papers of the A4H size have been set and, thereafter, he must designate the selection of the printer. Generally, the operator designates the printer without previously checking the paper size of the papers set in each printer. Therefore, when the papers of an undesirable size have been set in the designated printer, there are problems such that an undesirable print result is obtained or an error indicative of the dissidence of paper size is notified from the printer and the printing process cannot be rapidly started and the like.

In such a kind of printing system, further, in the case where the operator allows the print data to be generated from a host computer, he discriminates whether the print data needs a both-sides printing mode or not and must previously recognize and designate to which printer the print data is supplied.

Therefore, in the case where the operator discriminates that the print data needs the both-sides print, he checks which printer can execute the both-sides print and, thereafter, he must designate the printer which can perform the both-sides print and generate the print data. There are problems such that with an increase in number of printers, it takes a fairly long search time until the printing process is started, and the printing process efficiency is remarkably deteriorated.

SUMMARY OF THE INVENTION

It is an object of the invention to solve the above technical subjects.

Another object of the invention is to provide a printing system in which by automatically selecting a printer of an optimum processing speed in accordance with a volume of a job, a group of printers in the system can be efficiently made operative indepedently of a vague selection of the printer by the operator.

Still another object of the invention is to provide a printing system in which by automatically selecting a printer which can feed papers of a necessary size, the occurrence or the like of a print activation error due to the dissidence of the paper size by the operator is prevented, while a group of printers in the system can be efficiently made operative.

Further another object of the invention is to provide a printing system in which by automatically selecting a printer which can execute a both-sides print in accordance with response information from each printer in response to a request from a host computer, a group of printers in the system can be efficiently made operative without needing the troublesome judgment and search by the operator.

The above and other objects, features, and advantages of the present invention will become apparent from the following detailed description and the appended claims with reference to the accompanying drawings.

BRIEF DESCRIPTION OF THE DRAWINGS

FIGS. 4A to 4C are diagrams showing examples (the first to third embodiments) of the construction of an output job control table shown in FIG. 2;

FIG. 5 is a diagram showing a construction of a printer management table shown in FIG. 2;

DETAILED DESCRIPTION OF THE PREFERRED EMBODIMENTS

Preferred embodiments of the invention will be described in detail hereinbelow with reference to the drawings.
(First embodiment)

Figure 1A:
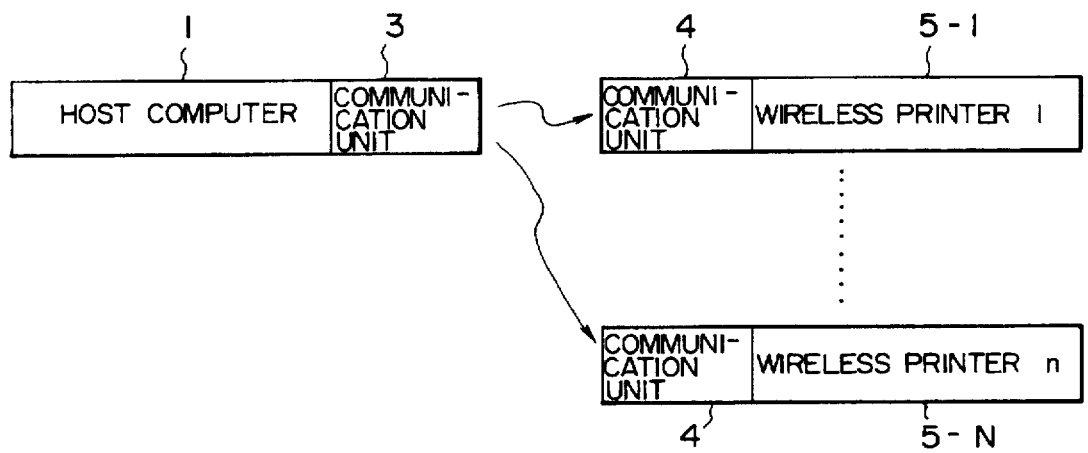
FIGS. 1A and 1B are block diagrams showing environmental constructions of printing systems showing the first to third embodiments of the invention.
Figure 1B:
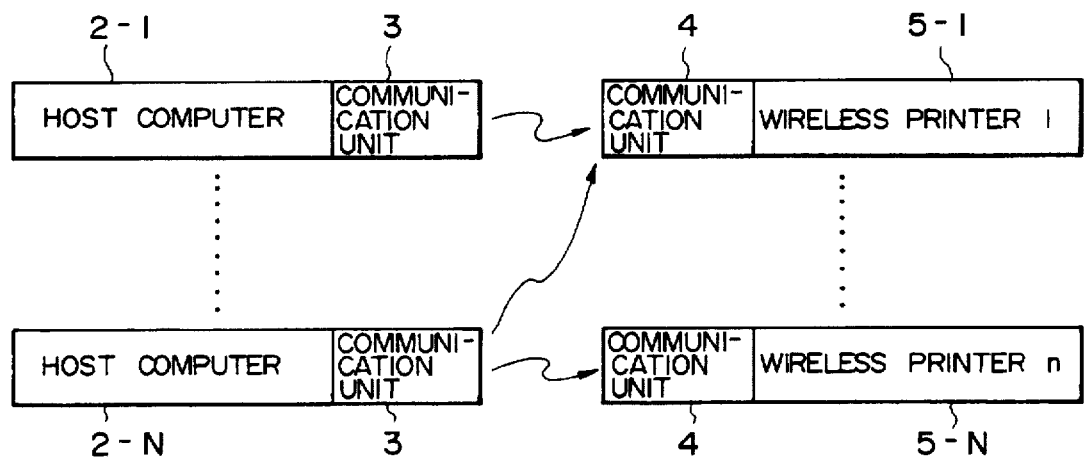

FIGS. 1A and 1B are block diagrams showing environmental constructions of printing systems showing the first to third embodiments of the invention. Reference numerals 1 and 2-1 to 2-N denote host computers-each of which can mutually execute wireless communications with printer groups each comprising printers (wireless printers) 5-1 to 5-N of the wireless communication type and the like through communication units 3 and 4 and can perform a printing process. Particularly, FIG. 1A shows the case where a printing system is constructed by one host computer 1 and a plurality of wireless printers 5-1 to 5-N connected to the host computer 1. FIG. 1B shows the case where a printing system is constructed by a plurality of host computers 2-1 to 2-N and a plurality of wireless printers 5-1 to 5-N connected to the plurality of host computers 2-1 to 2-N.

Figure 2:
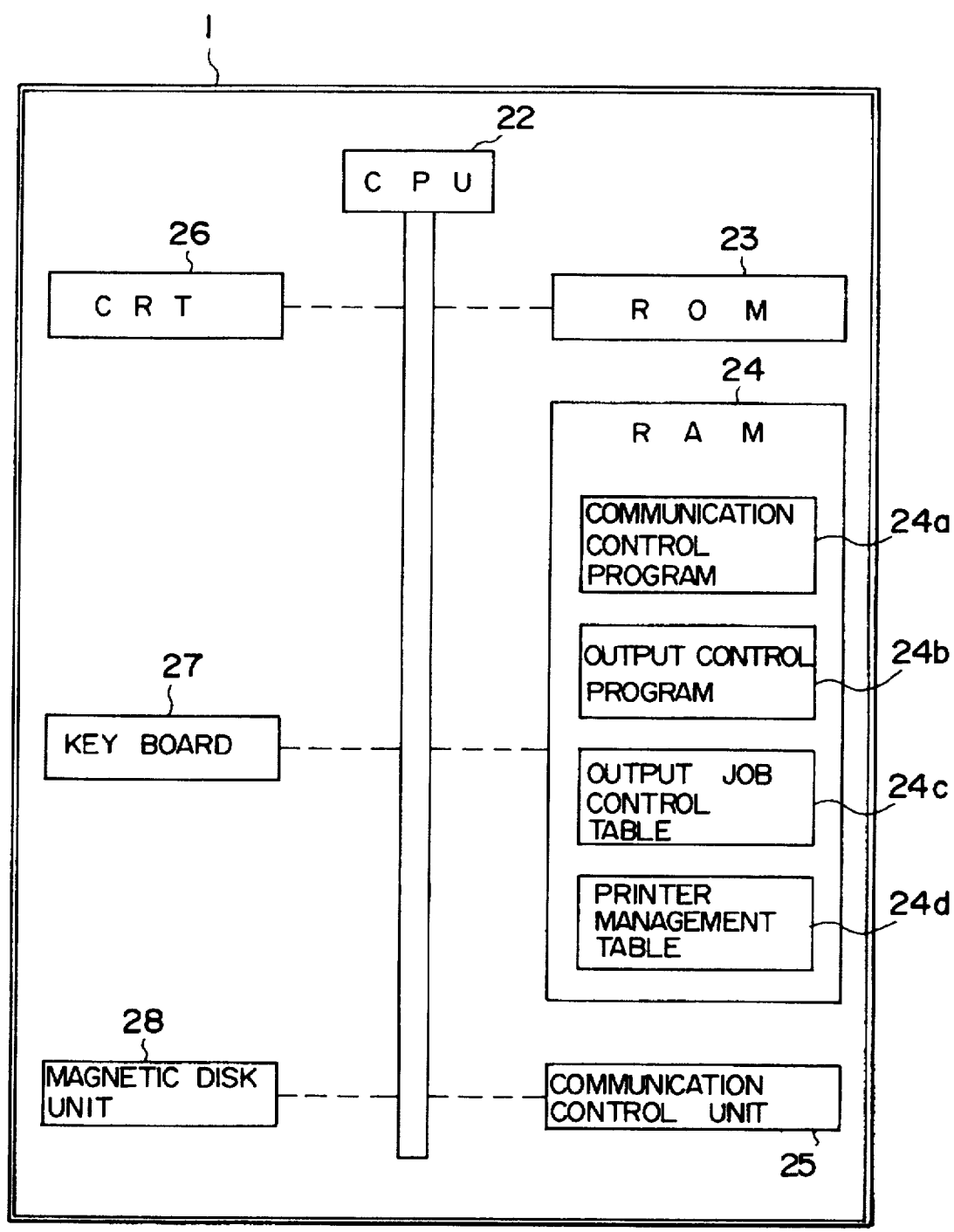
FIG. 2 is a circuit block diagram for explaining a construction of a host computer shown in each of FIGS. 1A and 1B.

FIG. 2 is a circuit block diagram for explaining the construction of the host computer shown in each of FIGS. 1A and 1B. Reference numeral 22 denotes a CPU for integratedly controlling each device connected to a system bus on the basis of a control program stored in an ROM 23.

Reference numeral 24 denotes an RAM having a communication control program 24a, an output control program 24b, an output job control table 24c, and a printer management table 24d.

A communication control unit 25 performs transmission and reception with each of the wireless printers 5-1 to 5-N and is controlled by the communication control program 24a. Reference numeral 28 denotes a magnetic disk unit. An output job which has been aligned in a predetermined output format is temporarily stored. The CRT display 26 displays an, error status or the like. A keyboard 27 is used when the operator inputs a command such as an output command or the like.

Figure 3:
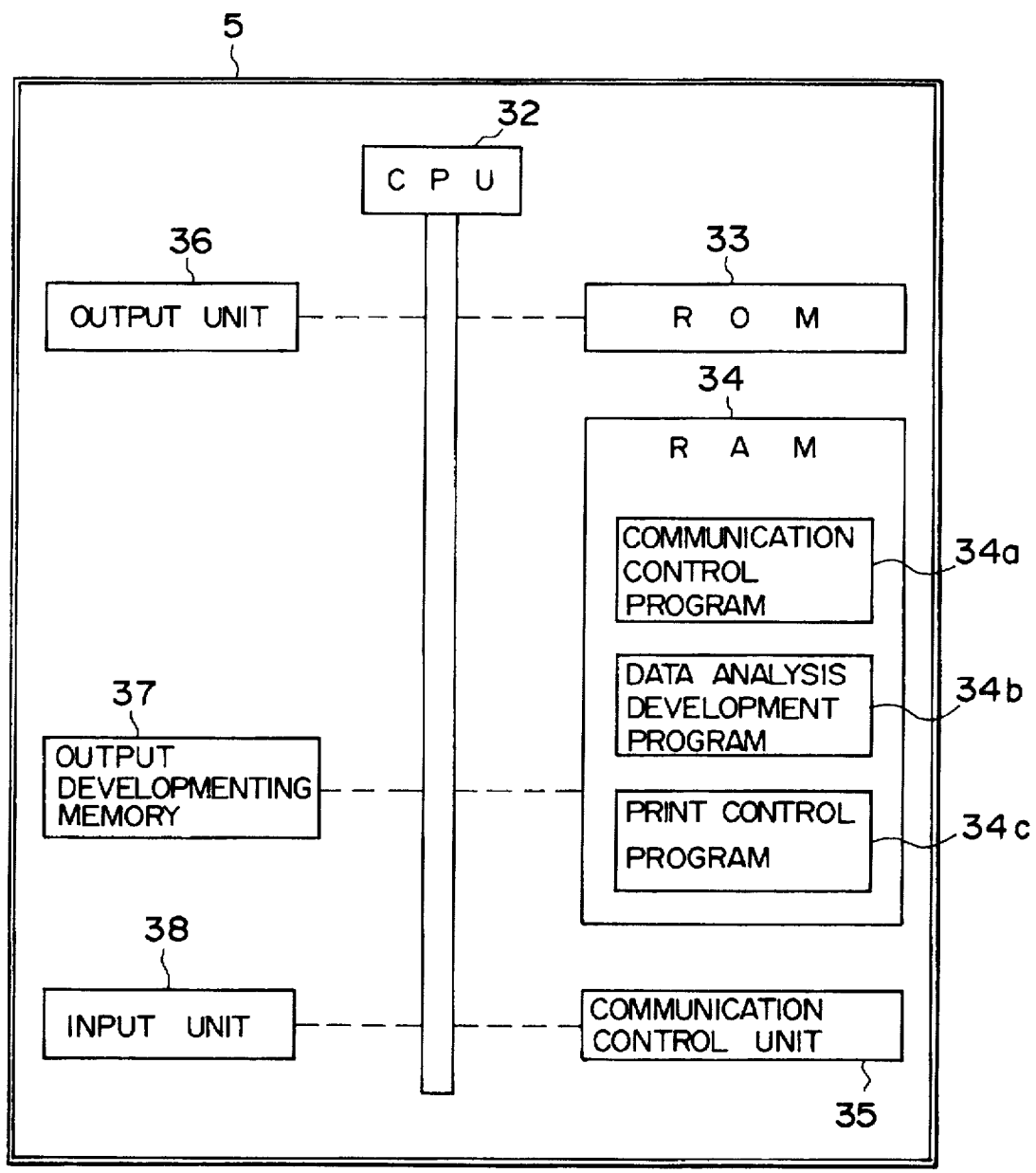
FIG. 3 is a circuit block diagram for explaining a construction of a wireless printer shown in each of FIGS. 1A and 1B.

FIG. 3 is a circuit block diagram for explaining a construction of the wireless printer shown in each of FIGS. 1A and 1B. For instance, FIG. 3 shows the case of the wireless printer 5-1.

In the diagram, reference numeral 32 denotes a CPU for integratedly controlling the devices which are connected to the system bus on the basis of a control program stored in an ROM 33. Reference numeral 34 denotes an RAM having therein a communication control program 34a, a data analysis development program 34b, and a print control program 34c.

Reference numeral 35 denotes a communication control unit for performing transmission and reception with each of the host computers 1 and 2-1 to 2-N and is controlled by the communication control program 34a. Reference numeral 36 denotes an output unit, 37 an output developing memory, and 38 an input unit.

FIG. 4A is a diagram showing a construction of the output job control table 24c shown in FIG. 2 in the first embodiment. The table 24c is constructed by a job name, a volume, and a printer ID.

In the printing system according to the first embodiment, the CPU 22 as selecting means automatically selects an arbitrary printer of the optimum processing speed by collating the processing speed information which is responded from each of the printers 5-1 to 5-N for the information which is wireless transmitted from the host computer 1 or the like to each of the printers 5-1 to 5-N and a job volume which is required by the host computer 1, thereby allowing the printing process to be started.

FIG. 5 is a diagram showing a construction of the printer management table 24b shown in FIG. 2. The table 24d is constructed by a printer ID, a printer status, and the like.

Figure 6:
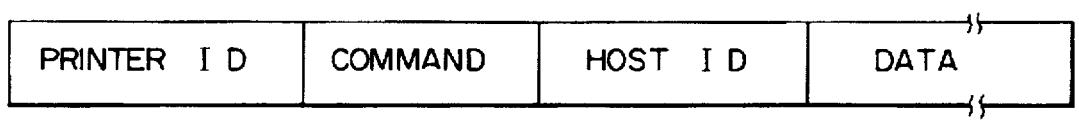
FIG. 6 is a diagram showing a data structure of a transmission message from the host computer shown in each of FIGS. 1A and 1B.

FIG. 6 is a diagram showing a data structure of a transmission message from the host computer shown in FIG. 1. The transmission message data is constructed by a printer ID, a command, a host ID, data, and the like.

Figure 7:
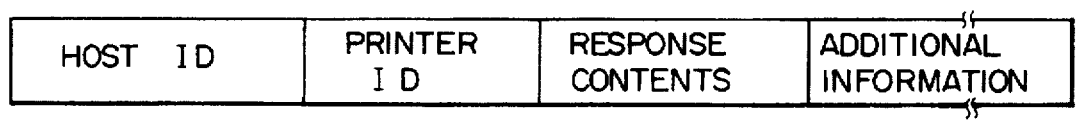
FIG. 7 is a diagram showing a data structure of a response message from the printer shown in each of FIGS. 1A and 1B.

FIG. 7 is a diagram showing a data structure of a response message from the printer shown in each of FIGS. 1A and 1B. The response message data is constructed by a host ID, a printer ID, response contents, additional information, and the like.

The additional information in the first embodiment includes the print speed of the printer.

A data processing operation of the host computer will now be described hereinbelow with reference to a flowchart shown in FIG. 8.

Figure 8:
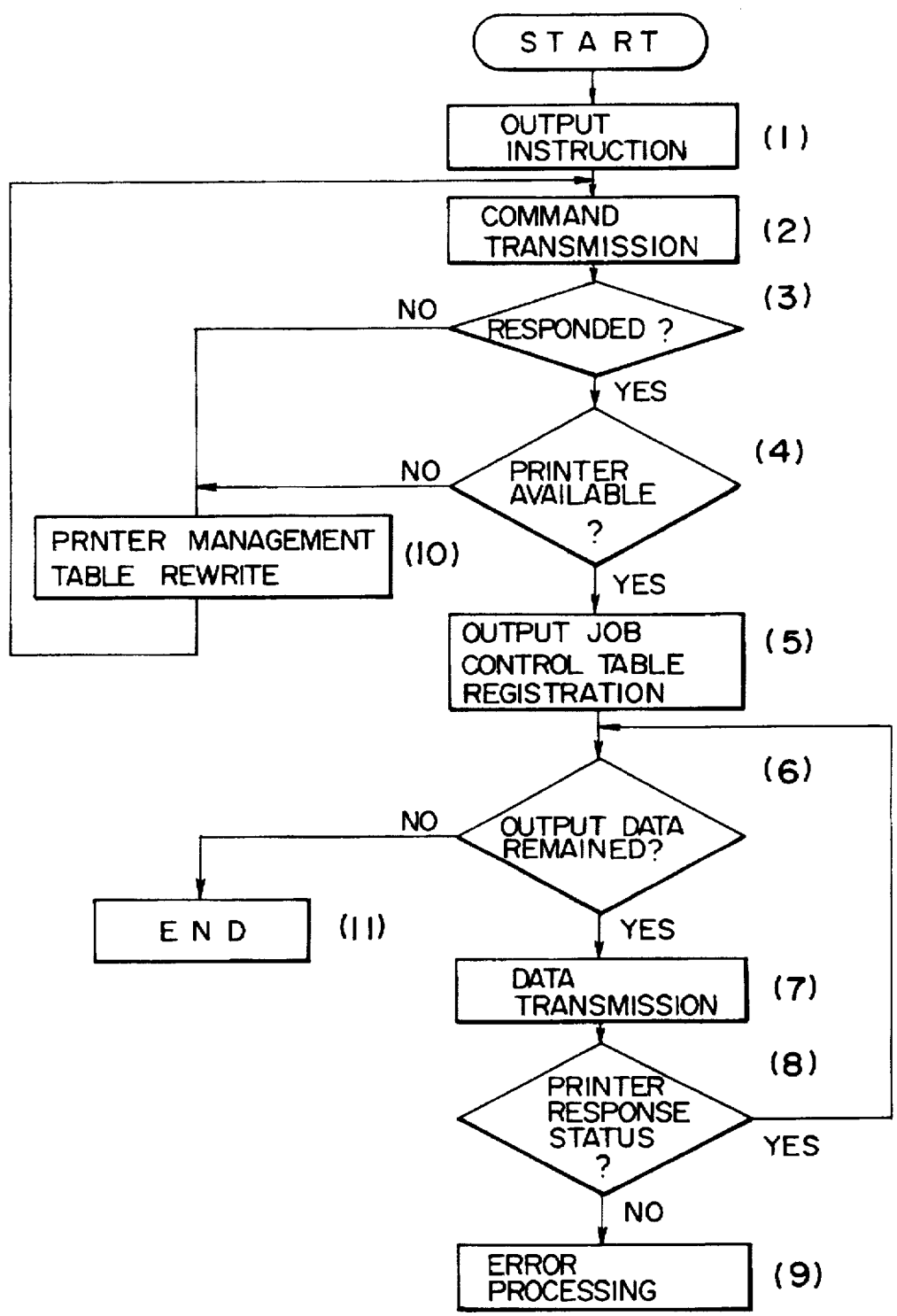
FIG. 8 is a flowchart showing an example of a data processing procedure of the host computer according to the printing system of the invention.

FIG. 8 is the flowchart showing an example of a data processing procedure of the host computer according to the printing system in the invention. Reference numerals (1) to (11) denote processing steps.

When the operator instructs the output by the keyboard 27 (1), a command (The printer management table 24d (refer to FIG. 5) is checked. The printer which is in a FREE (unused) state is searched. The message of the data format shown in FIG. 6 is formed and transmitted to the printer Via the communication control program 24a. At this time, a command indicative of the print request is set in the term of the command.) is transmitted (2). A check is made to see if a response has been obtained from the printer for a period of time when a predetermined time elapses or not (3). If NO, "Not Ready" is set into the printer status in the printer management table 24d (10). A print request command is transmitted to the next printer ID (2).

On the other hand, if YES in step (3), a check is made to see if the printer is available or not (4). If YES (positive response), a check is made to see if the printing speed set in the additional information of the response message is proper to the volume of the job or not. If OK, the-output control program 24b executes a process to register the output job name and the job volume into the output job control table 24c (refer to FIG. 4) (5).

If NO in step (4), the processing routine advances to step (10) and the foregoing process is executed.

A check is now made to see if output data to be transmitted still remains or not (6). If NO, an end process to transmit a print end command to the printer is executed (11). If YES, the transfer of the print data is started (7). A check is made to see if the next block is requested or not from the printer response status (8). If YES, the processing routine is returned to step (6). If NO, it is determined that an error has occurred. A predetermined error corresponding process is executed (9).

Figure 9:
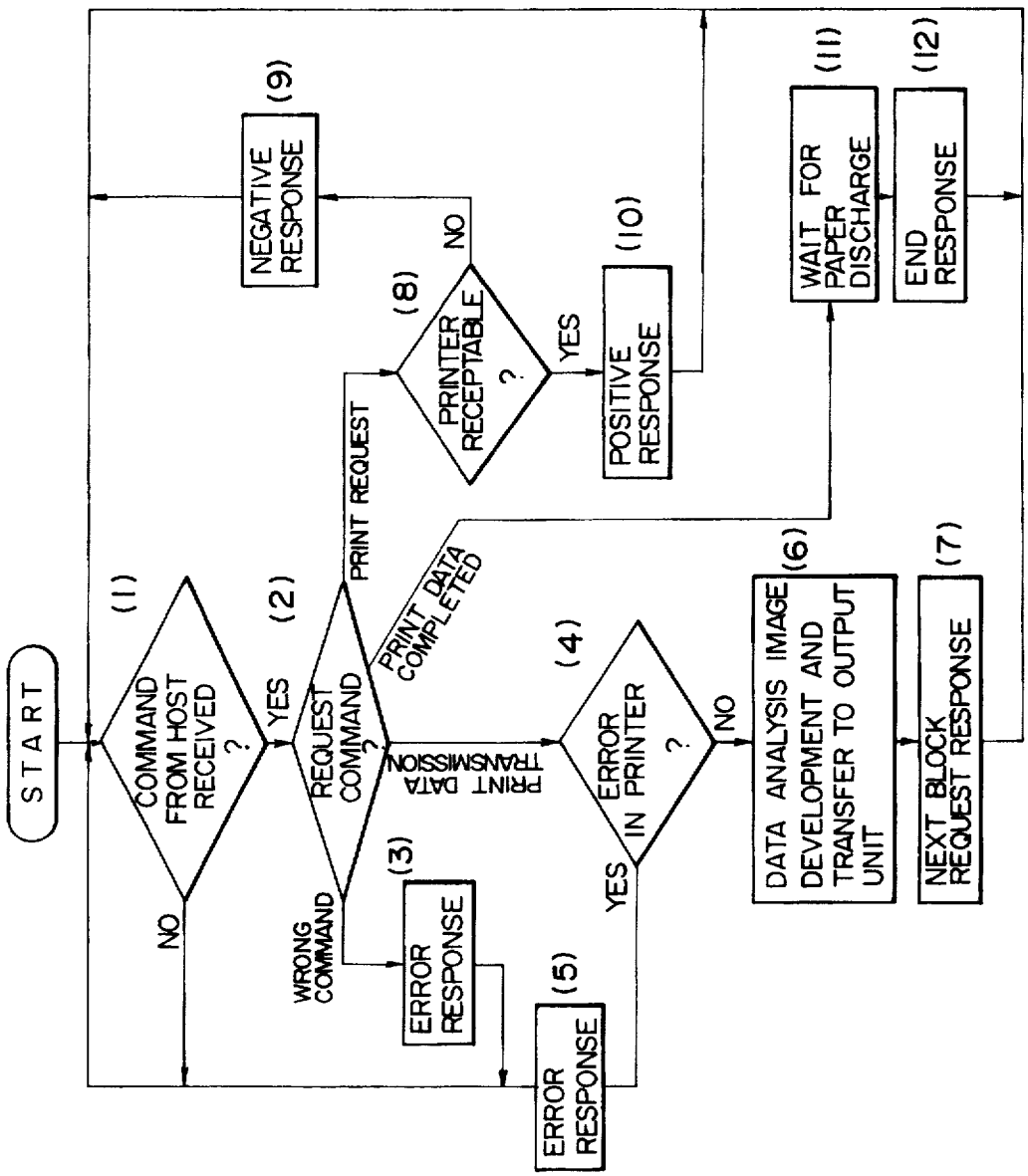
FIG. 9 is a flowchart showing an example of a data processing procedure of the printer according to the printing system of the invention.

FIG. 9 is a flowchart showing an example of a data processing procedure of the printer according to the printing system of the invention. Reference numerals (1) to (12) indicate processing steps.

The system waits for the command reception from the host computer (1) and a check is made to see if the printer ID of the message coincides with the ID of the system itself or not. When they coincide, the term of the request command of the message is checked (2). When the command is the wrong command, an error response, is executed (3) and the processing routine is returned to step (1).

When a print data transmission command is received in the discriminating step (2), a check is made to see if an error (jam, no paper, or the like) has occurred in the printer or not (4). If YES, an error response is executed (5) and the processing routine is returned to step (1).

On the other hand, if NO in step (4), a data analysis, an image development, and a transfer to the output unit are executed (6). A next block request response is performed (7). The processing routine is returned to step (1).

When it is determined in step (2) that the request command is a print request command, a check is made to see if the printer is available or not (8). If NO, a negative response is returned (9) and the processing routine is returned to step (1). If YES, a positive response (the additional information of the response message includes the printing speed) is returned to the host computer by a message of a format shown in FIG. 7 (10) and the processing routine is returned to step (1).

On the other hand, when it is determined in step (2) that the request command indicates the end of print data, the system waits for the paper discharge (11) and sends a response signal indicative of the end of print data to the host computer (12). The processing routine is returned to step (1).

Although the above embodiment has been described in the case where a retry is executed many times when the adaptive printer cannot be found out as results of that the print request has been transmitted to all of the printers registered in the printer management table 24d, it is also possible to construct in a manner such that the operator can call.

On the other hand, when the printer of a desired printing speed happens to be in a BUSY state, namely, when it is used by another host computer, the further improvement of a print processing efficiency can be expected by constructing in a manner such that an output job is spooled in the magnetic disk unit 28 of the host computer or the magnetic disk unit 28 on the printer side or the like and, when the printer is set into the FREE state, the data is printed.

As described above, there is provided the selecting means for automatically selecting an arbitrary printer of an optimum processing speed by collating the processing speed information which is responded from each printer in response to a request from each host computer and the job volume which is requested from each host computer. Therefore, the vague printer selection by the operator of each host computer can be previously avoided. The job from each host computer according to the processing speed of each printer can be efficiently processed. Consequently, there is an effect such that the print processing efficiency in the system environment can be remarkably improved or the like.

(Second embodiment)

A printing system according to the second embodiment has a construction similar to that of the first embodiment (FIGS. 1 to 3) mentioned above. However, the CPU 22 (refer to FIG. 2) as selecting means automatically selects an arbitrary printer which can feed the paper of the optimum size by collating paper information which is responded from each of the printers 5-1 to 5-N for the information which has been wireless transmitted to each of the printers 5-1 to 5-N and the requested paper information, thereby allowing the printing process to be started.

FIG. 4B is a diagram showing a construction of the output job control table 24c shown in FIG. 2 according to the second embodiment. The table 24c is constructed by a job name, a paper size, and a printer ID.

In the embodiment, the paper size information is included in the additional information of the response message shown in FIG. 7.

The operation of the second embodiment will now be described hereinbelow with respect to points different from the operation of the foregoing first embodiment with reference to FIGS. 8 and 9. In the second embodiment, when a positive response is received in step (4) in FIG. 8, a check is made to see if the paper size information set in the additional information of the response message coincides with the desired paper size or not. If OK, the output control program 24b executes a process to register the output job name, paper size, and printer ID into the output job control table 24c (refer to FIG. 4) (5).

In the embodiment, data indicative of the paper size which has been set at present in the printer is included in the additional information of the response message of the positive response which is returned in step (10) in FIG. 9.

As described above, according to the embodiment, there is provided the selecting means for automatically selecting an arbitrary printer which can feed the paper of a desired size by collating the paper information which is responded from each printer in response to the request from each host computer and the paper information which is requested from each host computer. Therefore, it is possible to prevent a situation such that the printer which cannot feed the paper of a desired paper size is selected by the vague printer selection by the operator of each host computer.

Consequently, there are effects such that the occurrence of a paper feed error in the system environment is reduced, the print processing efficiency can be remarkably improved, and the like.

(Third embodiment)

A printing system according to the third embodiment has a construction similar to that in the foregoing first embodiment (FIGS. 1 to 3). However, the CPU 22 (refer to FIG. 2) as selecting means automatically selects an arbitrary printer which can print to both sides by analyzing the response information which is responded from each of the printers 5-1 to 5-N for the information which has been wireless transmitted to each of the printers 5-1 to 5-N, thereby allowing the printing process to be started.

FIG. 4C is a diagram showing a construction of the output job control table 24c shown in FIG. 2 in the third embodiment. The table 24c is constructed by a job name, both-sides/one-side information, and a printer ID.

In the-third embodiment, both-sides/one-side information is included in the additional information of the response message shown in FIG. 7.

The operation of the third embodiment will now be described hereinbelow with respect to points different from the foregoing first embodiment with reference to FIGS. 8 and 9.

In the embodiment, when a positive response is received in step (4) in FIG. 8, a check is made to see if both sides can be printed or not by analyzing the both-sides print information set in the additional information of the response message. If OK, the output control program 24c executes a process to register the output job name, data indicative of the both-sided print, a print ID, and the like into the output job control table 24c (refer to FIG. 4) (5).

Information indicating whether the printer can print both sides or not is included in the additional information of the response message of the positive response which is returned in step (10) in FIG. 9.

As described above, according to the invention, there is provided the selecting means for automatically selecting an arbitrary printer which can print both sides by analyzing the response information which is responded from each printer in response to a request from each host computer. Therefore, each host computer can automatically select the printer which can print both sides and both-sides print information can be transmitted. Thus, a burden such that the operator executes the operation to select the both-sides printer is remarkably reduced.

Thus, the print processing efficiency in the system environment can be extremely improved.

The invention can arbitrarily combine the first to third embodiments as further another embodiment. That is, another embodiment has modes corresponding to at least two of the first to third embodiments and one of the two modes can be selected. Further, it is preferable to construct in a manner such that at least two of the paper size information, both-sides print information, and processing speed information are returned as additional information of the response message and a check is made to see if the print data should be transmitted to the printer or not on the basis of the two additional information. Even when the printer which can satisfy the condition regarding the processing speed information at that time is not available, the print data may be also supplied to the printer so long as a printer which satisfies the conditions regarding the other information and is available exists.

The present invention is not limited to the foregoing embodiments but many modifications and variations are possible within the spirit and scope of the appended claims of the invention.

I claim:

1. A printing system comprising:
   a plurality of printing units;
   at least one data source for sending print data to one of the plurality of printing units;
   information generating means, provided for each said data source, for generating information indicating an amount of print data to be transmitted;
   transmitting means, provided for each of the plurality of printing units, for transmitting, to each said data source, information indicating a printing speed of the corresponding printing unit;
   receiving means, provided for each said data source, for receiving the information indicating the printing speed transmitted by said transmitting means; and
   selecting means, provided for each said data source, for selecting one of the plurality of printing units to which the corresponding data source is to transmit print data, said selecting means selecting in accordance with both the information indicating the amount of print data, generated at the corresponding data source, and the received information indicating the printing speed.

2. A system according to claim 1, wherein the transmitting means transmits the information indicating the printing speed together with an identification code of the printing unit.

3. A system according to claim 1, wherein each said data source comprises means for generating information indicative of a size of a print medium on which print data to be transmitted should be printed, and
   wherein the transmitting means further transmits information indicative of a size of a print medium set in the printing unit.

4. A system according to claim 1, wherein each said data source comprises means for generating information indicating whether or not the print data to be transmitted should be printed on both sides of a print medium, and
   wherein the transmitting means further transmits information indicating whether or not the printing unit has the function of printing both sides of a print medium.

5. A system according the claim 1, wherein the data source transmits an identification code to identify the printing unit selected by the selecting means together with the print data.

6. A system according to claim 1, wherein the transmitting means transmits the information indicating the printing speed in response to request data transmitted from the data source.

7. A system according to claim 6, wherein the data source transmits an identification code indicative of each printing unit together with the request data.

8. A system according to claim 6, wherein the system has a plurality of data sources, and each of the data sources transmits a respective identification code and an identification code indicative of each printing unit together with the request data.

9. A system according to claim 1, wherein the data source communicates with the printing unit by wireless communication.

10. A system according to claim 1, further comprising means for storing the print data to be transmitted when the printing unit selected by said selecting means is in a busy status.

11. A system according to claim 1, wherein the print data is transmitted in predetermined units, each printing unit further comprising means for transmitting information for requesting print data of a next predetermined unit after print data of one predetermined unit is received.

12. An apparatus for controlling printing means, comprising:
   receiving means for receiving print data transmitted from a data source, and for receiving a predetermined request signal transmitted from the data source;
   means for outputting the print data received by the receiving means to the printing means; and
   transmitting means for transmitting, to the data source, information indicating a printing speed of the printing means in response to the predetermined request signal.

13. An apparatus according to claim 12, wherein the transmitting means transmits the information indicating the printing speed together with an identification code of the apparatus.

14. An apparatus according to claim 12, wherein said apparatus communicates with the data source by wireless communication.

15. An apparatus according to claim 12, further comprising the printing means.

16. An apparatus for transmitting print data to one of a plurality of printing units, comprising:
   means for generating information indicating an amount of print data to be transmitted;
   receiving means for receiving information, from each printing unit, indicating a printing speed of the printing unit; and
   selection means for selecting one of the plurality of printing units to which the print data is to be transmitted from the plurality of printing units based on the information indicating the amount of print data and the information indicating the printing speed.

17. An apparatus according to claim 16, further comprising means for generating information indicative of a size of a print medium on which print data to be transmitted should be printed,
   wherein said receiving means further receives information indicative of a size of a print medium set in the printing unit.

18. An apparatus according to claim 16, further comprising means for generating information indicating whether or not the print data to be transmitted should printed on both sides of a print medium,
   wherein said receiving means further receives information indicating whether or not the printing unit has the function of printing on both sides of a print medium.

19. An apparatus according to claim 16, wherein the apparatus transmits an identification code to identify the printing unit selected by the selection means together with the print data.

20. An apparatus according to claim 16, wherein the apparatus transmits predetermined request data to the plurality of printing units for requesting the information indicating the printing speed.

21. An apparatus according to claim 20, wherein the apparatus transmits an identification code indicative of each of the plurality of printing units together with the request data.

22. An apparatus according to claim 20, wherein the apparatus transmits an identification code of the apparatus and an identification code indicative of each of the plurality of printing units together with the request data.

23. A printing system comprising:

a plurality of printing units;

at least one data source for sending print data to one of the plurality of printing units;

judging means, provided for each said data source, for judging whether or not print data to be transmitted should be printed on both sides of a print medium;

transmitting means, provided for each of the plurality of printing units, for transmitting, to each said data source, information indicating whether or not the corresponding printing unit can print on both sides of a print medium;

receiving means, provided for each said data source, for receiving the information indicating whether or not the corresponding printing unit can print on both sides of a print medium; and selecting means, provided for each said data source, for selecting one of the plurality of printing units to which the corresponding data source is to transmit print data, said selecting means selecting in accordance with both a judging result by the corresponding judging means and the received information indicating whether or not the corresponding printing unit can print on both sides of a print medium.

24. An apparatus for controlling printing means, comprising:

receiving means for receiving print data transmitted thereto from a data source, and for receiving a predetermined request signal transmitted from the data source;

means for outputting the print data received by the receiving means to the printing means; and transmitting means for transmitting, to the data source, information indicating whether or not the printing means can print both sides of a print medium in response to the predetermined request signal.

25. An apparatus for transmitting print data to one of a plurality of printing units, comprising:

means for judging whether or not print data to be transmitted should be printed on both sides of a print medium;

receiving means for receiving, from each printing unit, information indicating whether or not the printing unit has a function of printing on both sides of a print medium; and selection means for selecting one of the plurality of printing units to which the print data is to be transmitted from the plurality of printing units based on the received information indicating whether or not the printing unit has the function of printing on both sides of a print medium and a judging result of the judging means.

26. A system according to claim 23, wherein each said transmitting means transmits the information together with an identification code identifying the corresponding printing unit.

27. A system according to claim 23, wherein one of said data sources sends, to one of said printing units, request data, and the transmitting means of the one printing unit transmits the information to the one data source in response to the request data.

28. A system according to claim 27, wherein the one data source sends, as part of the request data, an identification code identifying the one printing unit.

29. A system according to claim 28, wherein the system includes a plurality of said data sources, and wherein each one of said data sources sends, as part of its request data, a respective identification code and an identification code identifying the one printing unit.

30. A system according to claim 23, wherein each said transmitting means further transmits size information indicative of a size of a print medium set in the corresponding printing unit, and wherein each said data source compares the received size information with a desired size.

31. A system according to claim 23, wherein, after the selecting means of one of said data sources selects one of the printing units, the one data source transmits, with the print data, an identification code identifying the selected printing unit.

32. A system according to claim 23, wherein each said data source communicates with each said printing unit by wireless communication.

33. A system according to claim 23, wherein each said data source includes a memory for storing the print data to be transmitted when the printing unit selected by the corresponding selecting means is busy.

34. A system according to claim 23, wherein the print data is transmitted in blocks, and wherein each said printing unit includes means for transmitting, after the print data of one block has been received, a request for the print data of a next following block.

35. An apparatus according to claim 24, wherein said transmitting means transmits the information together with an identification code identifying the printing means.

36. An apparatus according to claim 24, wherein said apparatus communicates with the data source by wireless communication.

37. An apparatus according to claim 25, wherein said receiving means further receives size information indicative of a size of a print medium set in the corresponding printing unit, and wherein said apparatus compares the received size information with a desired size.

38. An apparatus according to claim 25, wherein, after said selection means selects one of the printing units, said apparatus transmits, with the print data, an identification code identifying the selected printing unit.

39. An apparatus according to claim 25, wherein said apparatus sends, to one of said printing units, request data for requesting the information.

40. An apparatus according to claim 39, wherein said apparatus sends, as part of the request data, an identification code identifying the one printing unit.

41. An apparatus according to claim 39, wherein said apparatus sends, as part of the request data, an identification code identifying said apparatus and an identification code identifying the one printing unit.

* * * * *

UNITED STATES PATENT AND TRADEMARK OFFICE
CERTIFICATE OF CORRECTION

PATENT NO. : 5,696,894

DATED : December 9, 1997

INVENTOR(S): KENICHI ONO

It is certified that error appears in the above-identified patent and that said Letters Patent is hereby corrected as shown below:

On drawing

SHEET 3
 FIG. 3, "DEVELOPMENTING" should read --DEVELOPING.

SHEET 7
 FIG. 8, "PRNTER" should read --PRINTER--.

COLUMN 2
 Line 2, "indepedently" should read --independently--.

COLUMN 8
 Line 50, "should" should read --should be--.

Signed and Sealed this

Fourteenth Day of July, 1998

Attest:

BRUCE LEHMAN

*Attesting Officer*  *Commissioner of Patents and Trademarks*